United States Patent
Hurlbutt et al.

[15] 3,651,455
[45] Mar. 21, 1972

[54] PNEUMATIC TIRE SAFETY DEVICE

[72] Inventors: Duane Hurlbutt, P.O. Box 302; Tito Scarponi, 124 Coddington Road, both of Ithaca, N.Y. 14850

[22] Filed: Mar. 19, 1969

[21] Appl. No.: 808,585

[52] U.S. Cl. .................... 340/58, 116/34, 180/82, 180/103, 200/61.25, 340/52
[51] Int. Cl. ............................................ B60c 23/04
[58] Field of Search ............ 340/58, 52, 213; 180/82, 103; 200/61.22, 61.25; 116/34

[56] References Cited

UNITED STATES PATENTS

| | | | |
|---|---|---|---|
| 1,250,476 | 12/1917 | McKee | 116/34 |
| 1,662,706 | 3/1928 | Hill | 116/34 |
| 1,838,295 | 12/1931 | Bianchi | 200/61.25 |
| 2,411,285 | 11/1946 | Miller | 116/34 |
| 2,723,700 | 11/1955 | Caldwell | 116/34 |
| 2,966,563 | 12/1960 | Bobenhausen | 200/61.25 |

*Primary Examiner*—John W. Caldwell
*Assistant Examiner*—Glen R. Swann, III
*Attorney*—Bradford S. Allen

[57] ABSTRACT

A pneumatic tire safety device that signals an alarm with loss of air pressure and releases air with over inflation.

7 Claims, 15 Drawing Figures

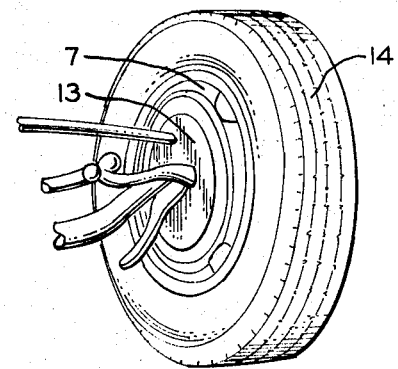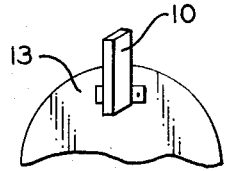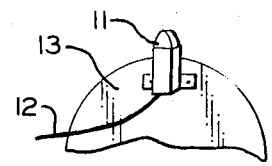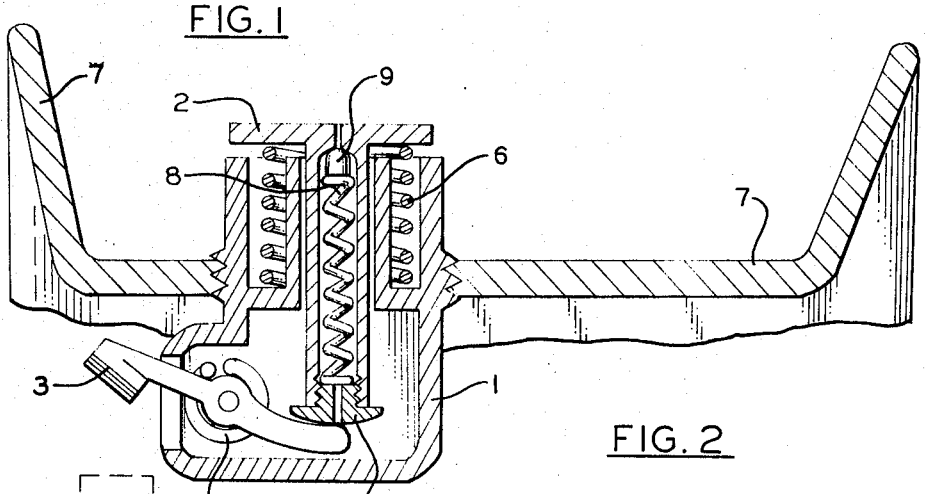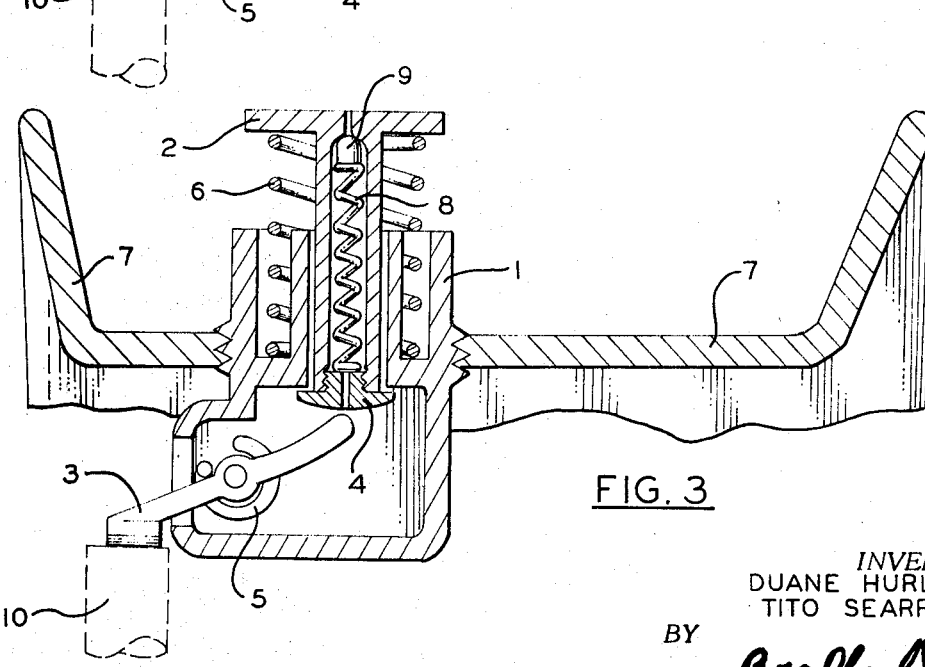

INVENTOR.
DUANE HURLBUTT
TITO SEARPONI
BY
Bradford S. Allen
ATTORNEY

PNEUMATIC TIRE SAFETY DEVICE

BACKGROUND OF THE INVENTION

Our invention relates to a mechanical system to give an operator of a truck, automobile, or airplane a signal because a pneumatic tire with the invention installed has an air pressure of less than the predetermined pressure point of safe pounds of air pressure set in the air alarm by means of a mechanical device that will determine air pressure in the tire and transmit the amount of pressure to the exterior of the tire and then release a signal of low air pressure to the operator by means of a noise or danger light on the instrument panel in front of the operator and also will eliminate the same time from becoming over inflated above a predetermined air pressure point by the use of an air pressure release valve.

FIELD OF THE INVENTION

When man learned to use rubber in his civilization, he was eager to use hard rubber band instead of a metal band around the exterior diameter of the wheel. The softer the rubber meant an easier ride, but also meant the rubber would wear out much faster. A rubber band on the wheel also meant a much quieter ride as compared to metal or wood bands around the exterior of the wheel.

As the wheel was improved, man had the desire to travel at higher speeds, so improved roads and sidewalks became a reality.

Hard solid rubber tires were a great improvement to man, but when man discovered he could use a thin hollow rubber tire and an inner tube placed on the interior of the tire, the ride was much smoother and quieter, so he could then travel much faster. Tires have been improved to the point that just the rubber tire and metal wheel are able to retain air pressure. In recent years most rubber tires used are tubeless pneumatic rubber tires. The loss of air pressure in a pneumatic tire is a constant and serious problem with a pneumatic tire. If a pneumatic tire is used at low pressures, there is a great strain on the casing of the tire which could cause a break in the casing, thus, the tire would become "flat." If a pneumatic tire is used with low air pressure or driven flat, the tire will become ruined, as well as giving a very rough ride.

A pneumatic tire has a tendency to lose air pressure. Many people have their pneumatic tires' air pressure checked from every 1 to 3 months. The only way to check a pneumatic tire air pressure is to physically inspect the tire and check the air pressure with a tire air pressure gauge placed on the valve stem of the tire and read the gauge. Of course the tire has to be in a stationary position to check the air pressure with a gauge.

DESCRIPTION OF THE PRIOR ART

There is no present day method of checking air pressure in a pneumatic tire on a truck, automobile or airplane while the apparatus is in motion. A truck or automobile driven on a long trip could obtain a slow leak in a pneumatic tire and travel hours on a soft tire before the tire would become soft enough to draw the vehicle sideways or run rough enough so the operator would realize a pneumatic tire needed to be repaired. When a pneumatic tire is used with low air pressure, the tire casing is under extra strain, and thus a change for a break in the tire casing is multiplied. A break in a pneumatic tire would cause a sudden and complete loss of air to the tire. At this point, the tire would have to be removed and replaced with another tire. At high speeds, the operator would lose control of his vehicle, while at slow speeds, the flat tire would flop and ride rough.

Tires may also be over inflated; instead of wearing the outside of tire tread faster then the center of the tread with under inflation, the reverse happens. The center of the tread wears faster than the outside of the tread. Tires with the proper amount of air pressure will obtain even tire tread wear.

Tires that have been properly inflated in cooler environments and transferred to much warmer surroundings will have a great increase in air pressure. Then the tires will give a rougher ride and the center of the tire will wear out faster. Tires properly inflated at 10° above zero fahrenheit driven to a 100° above zero fahrenheit could increase the air pressure up to 50 per cent. Besides a rougher ride, the higher air pressure in the tire multiplies the chance of the tires to create "Blowouts."

Trucks usually have dual tires at both ends of all axles except the front axle which usually has just a single tire mounted on each end. Operators of large trucks traveling at high speeds are always concerned about just a single tire going flat at a dual wheel location. When this happens, the single tire has to carry twice the load that it was designed to carry, thus multiplying the change of the single tire to "blow-out." When just one tire is flat at a dual tire location, the operator has a difficult time to check all tires while his rig is stopped. The drivers quite often will kick a tire to check to see if the tire is soft. Tires are checked by a tire gauge usually from 2- to 4-month periods. Kicking a tire wouldn't let the operator know if the tire was just beginning to lose air. Looking at the tires to see if they squat is better than nothing, but all too often a tire will give a false impression if the load of the truck is not evenly distributed or if the ground the tires are on is not level and smooth.

The pilots of present airplanes have no way of telling a tire is soft while the airplane is taking off, landing, or taxiing. When the airplane is stopped, the pilot has many other jobs to complete, so a tire that is just starting to go soft would not be detected because the tire would appear hard to the pilot when he gives the airplane a visual check.

SUMMARY OF THE INVENTION

The purpose of our invention is to give the operator of a truck, an airplane or automobile a message in the form of a trouble light or noise when a pneumatic tire pressure is under a predetermined pressure set in the tire alarm invention. The predetermined pressure set in the alarm could be just a few pounds of pressure under the normal amount, but still keeping the tire hard enough for safe use; thus, the operator would have time to get the tire serviced before real serious trouble occurred. It is apparent the slower the loss of air pressure, the more time the operator would have to service the tire before the loss of air in the pneumatic tire would make the tire non-serviceable. Another purpose is not to let the tire become over inflated by providing an air release valve installed in the same unit.

BRIEF DESCRIPTION OF THE DRAWING

For a better understanding of the invention, reference is made to the present preferred description of the invention which is shown in the accompanying drawings which consist of:

FIG. 1, a perspective view of the inside of a pneumatic tire mounted on a wheel and the wheel axle.

FIG. 2, a cross section view of the alarm valve and release valve installed in a wheel with proper air pressure.

FIG. 3, a cross section view of the alarm valve and release valve installed in a wheel with low or no air pressure.

FIG. 4, a perspective view of the noise making part of the alarm anchored to the brake drum part of the wheel.

FIG. 5, a perspective of an electrical switch mounted to the brake drum part of the wheel.

Referring to all nine figures, it is easy to note that the complete device will fit almost and type pneumatic tire wheel rim 7, including dual tires as reference is made to FIG. 6. FIG. 8 and FIG. 9 is a modification of the invention screwed on a typical valve stem of a tire.

Reference is made to FIG. 1, the wheel housing 13 is a non-rotating unit of the wheel assembly. The wheel rim 7 is a rotating unit and is secured to the wheel housing 13. The rubber tire 14 is mounted on the wheel rim 7. The air pressure valve and release valve, FIGS. 2 and 3, is installed on the inside flat section of the wheel rim 7. In FIG. 4, a piece of spring steel 10 is secured to wheel housing 13 in such a manner that spring steel 10 will not hit trigger 3 in FIG. 2 while there is proper air pressure in the tire 14 and will hit trigger 3 in FIG. 3 when air pressure is too low.

FIG. 5 may be preferred which will provide a light on the operator's dashboard instead of a metal hitting noise from FIG. 4 with a tire having improper air pressure. Spring steel 10 or light switch 11 may be secured anywhere around the diameter of the wheel housing 13, but we would prefer the top side of the wheel housing 13. Electrical wire 12 connects the electrical switch 11 to the battery and a trouble light on the operator's instrument panel.

Figure 6:
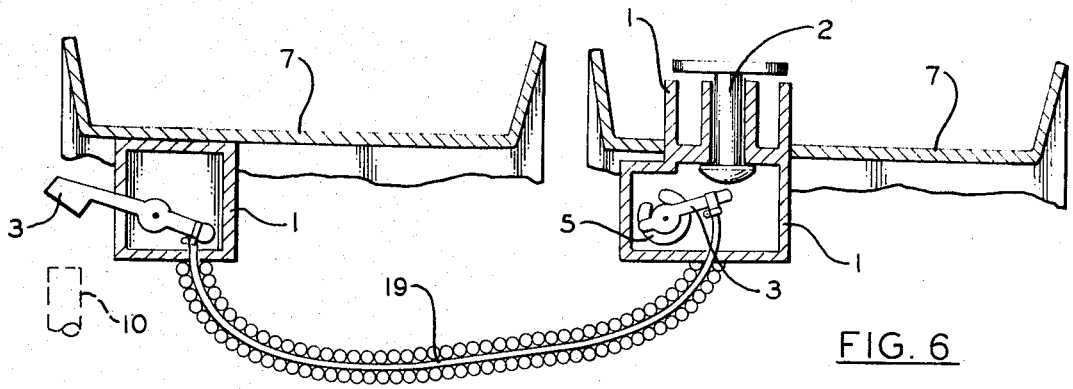
FIG. 6, a cross section of the alarm in two sections with a choke wire connecting both units, this model is used on outside dual tires, the plunger section unit is in the wheel rim of the outside dual tire and the trigger unit is installed on the inside of the inside dual wheel rim.
Figure 7A:
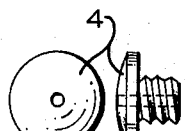
FIGS. 7a through 7g, a perspective view of all the moving components of the invention.
Figure 7B:
Figure 7C:
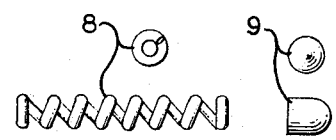
Figure 7D:
Figure 7E:
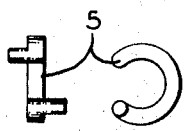
Figure 7F:
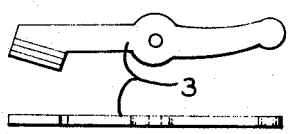
Figure 7G:
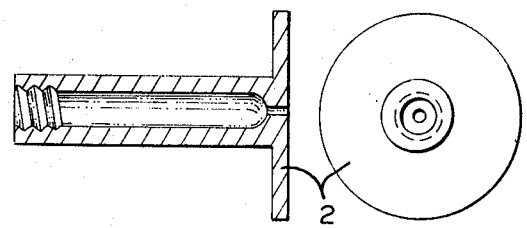

Reference is now made to FIG. 2 and FIG. 3, the body 1 of the invention has a section of it threaded and is screwed into a threaded hole in the inside of a wheel rim 7. Instead of threads, rubber female connections may be used on the invention itself to secure it to a hole in a wheel rim 7. The plunger valve 2 is precision fitted in the body 1 with the spring 6 forcing the plunger valve 2 to adjust with air pressure. The strength of the spring 6 will dictate the movement of the plunger valve 2. Inside the hollowed plunger valve 2 is another spring 8 with an air check ball 9 installed in the hollowed stem of the plunger valve 2 first and will fit air tight against the hole in the plunger valve 2. The cap 4 holds the spring 8 and the air check ball 9 inside the plunger valve 2. There is an air hole in the cap 4 so air can escape outward from the tire 14. The strength of the spring 8 will dictate when the air will escape from the tire 14. Thus, with a spring 8 with proper tension will prevent a pneumatic tire from becoming over inflated. A spring clip 5 hold the trigger 3 tight to the valve cap 4 at all positions of the plunger 2. With proper air pressure in the tire 14, the trigger 3 will not hit the spring steel 10 secured to the wheel housing 13 as the tire 14 rotates. With low air pressure, the trigger 3 will hit against the spring steel 10 each time the wheel rotates and will create a noise.

As will be observed by FIG. 6, the plunger 2 part of the alarm can be mounted on the inside of an outside dual wheel 7 and with the useage of a choke wire 19, the rest of the trigger 3 assembly can be mounted on the inside of the inside dual wheel.

DESCRIPTION OF THE PREFERRED EMBODIMENTS

Figure 8:
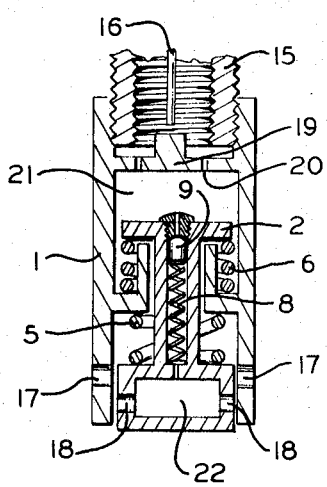
FIG. 8, a cross section view of the invention mounted on a valve stem of a tire with an air whistle type of an alarm.
Figure 9:
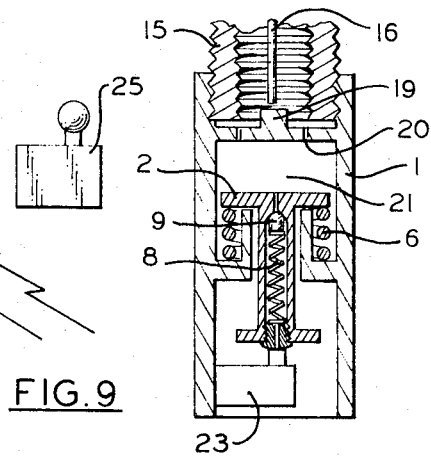
FIG. 9, a cross section view of the invention mounted on a valve stem of a tire using a relay installed in the invention to transmit a radio signal to a receiver, which the relay receives from a transmitter.

Referring to FIG. 8 and FIG. 9, the alarm and release valve invention can be modified so the invention may be used on an existing valve stem 15 of a pneumatic tire 14. The use of a trigger 3 would be eliminated. The body 1 is extended on both ends. One end is extended and threaded with female threads so the unit may be screwed on a valve stem 15. Also the same end would be modified with the cross section 19 which has at least one air hole 20 that will let air escape from the inside of the valve stem 15 to the air chamber 21 of the plunger valve 2. The cross section 19 is so designed that when the invention is screwed on a valve stem 15, the cross section 19 will transmit the air pressure from the inside of a pneumatic tire 14 to the air chamber 21 of the plunger valve 2 by holding the valve core 16 in toward the tire 14.

As shown is FIG. 8, the end of the body 1 opposite the valve stem 15, is extended far enough so it will cover the sides of the plunger 2 when the tire 14 has proper air pressure. The body 1 has two holes 17 opposite each other. The plunger valve 2 is modified so it has an air chamber 22 incorporated as part of the component. The air chamber 22 has two holes 18 opposite each other and when there is low air pressure, holes 17 and holes 18 will become enlined with each other, thus letting air pass through the air chamber 22, thus making a whistling sound when the pneumatic tire 14 has air pressure lower than a predetermined amount set by the spring 6.

Reference is now made to FIG. 9. FIG. 8 is the same as FIG. 9 except hole 17, hole 18, and air chamber 22 have been eliminated and a relay 23 has been secured to the inside of the body 1 in the area of the air chamber 22. When the pneumatic tire 14 has proper air pressure, the relay 23 is in open position and with low air pressure, the relay 23 is in closed position. A transmitter 24 is installed at the dashboard location and will transmit radio waves to the relay 23 at all times. A receiver 25 is installed also at the dashboard and will receive radio signals from the relay 23 when the pneumatic tire 14 has less air pressure than a predetermined amount and will turn on a light.

The foregoing is considered as illustrative only of the principles of the invention. Some modifications are easily accomplished, such as combining the air check ball 9 with the radio relay link 23, as in FIG. 9, and combining a whistle hole 17, an air check ball 9 and a valve stem mounting as in FIG. 8, all in one unit. Further, since numerous other modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pneumatic tire safety device which comprises:
    a. a hollow body housing;
    b. means for securing said body housing partially through a hole in the wheel rim preventing passage of air through said hole outside of said body housing and allowing air passage through said body housing;
    c. a hollow stemmed plunger valve fitted in the hollow portion of said body housing, the head of said valve having a hole smaller than the stem hollow and in communication therewith;
    d. means for adjusting said hollow stemmed plunger valve to air pressure;
    e. a signal device outside of said body housing;
    f. means for transferring movement of the hollow stemmed plunger valve to said exterior signal device;
    g. a cap with a hole;
    h. means for securing said cap to the hollow stem of the plunger valve, with the said cap hole in communication with the stem hollow;
    i. an air check ball inside said hollow stemmed plunger valve;
    j. a spring urging said air check ball against the plunger valve hole communicating with said hollow stem.

2. The pneumatic tire safety device of claim 1 in which the means for adjusting said hollow stemmed plunger valve to air pressure is comprised of a spring urging the plunger valve against the internal tire pressure, having a strength less than the anticipated inflated tire pressure and holding the valve open when at rest in a deflated tire.

3. The pneumatic tire safety device of claim 1 in which the means for transferring movement of the hollow stemmed plunger valve to a signal device comprises:
    a. a trigger extending through the body housing and mounted thereto for rotational movement;
    b. a spring clip mounted to urge one end of the trigger against the cap, so that movement of the cap is translated into movement of the trigger.

4. The pneumatic tire safety device of claim 1 in which the means for transferring movement of the hollow stemmed plunger valve to a signal device comprises:
    a. a relay mounted in the body housing within the travel distance of the stems of the plunger valve so that the relay switch will be closed when the plunger valve opens from reduced air pressure;

b. a transmitter to send radio waves to the said relay;

c. a receiver to accept radio waves from the relay to activate the signal device.

5. The pneumatic tire safety device of claim 3 in which the signal device comprises:

a. a signal switch that is mounted on the nonrotating unit of the wheel assembly outside of the path of said trigger when the tire is inflated and inside the path of said trigger when the said plunger valve is open a predetermined distance;

b. a light;

c. a source of power for said light;

d. means for transmitting power from said source to said light through said switch.

6. A pneumatic tire safety device which comprises:

a. a hollow body housing having at least one hole through said body housing wall nearer one end thereof;

b. means for securing the end of said body housing, which is further from said hole, to a tire valve stem so that all air passing through said stem must also pass through said housing;

c. means for opening the valve core within said tire valve stem, mounted within said hollow body housing so that passage of air from the pneumatic tire through said housing is not blocked;

d. a hollow stemmed plunger valve fitted in the hollow portion of said body housing, the head of said valve having a hole smaller than the stem hollow and in communication therewith;

e. means for adjusting said hollow stemmed plunger valve to predetermined air pressure;

f. a cap with a hole;

g. means for securing said cap to the hollow stem of the plunger valve with the said cap hole in communication with the stem hollow;

h. means for sealing said body housing hole when the pneumatic tire is inflated and for opening said body housing hole when the pneumatic tire air pressure is reduced said predetermined amount, so that the body housing hole will sound an alarm as the pnuematic tire rotates in an under inflated condition;

i. an air check ball inside said hollow stemmed plunger valve;

j. a spring urging said air check ball against the plunger valve hole communicating with said hollow stem.

7. A pneumatic tire safety device which comprises:

a. a hollow body housing;

b. means for securing said body housing to a tire valve stem so that all air passing through said stem must also pass through said housing;

c. means for opening the valve core within said tire valve stem, mounted within said hollow body housing so that passage of air from the pneumatic tire through said housing is not blocked;

d. a hollow stemmed plunger valve fitted in the hollow portion of said body housing, the head of said valve having a hole smaller than the stem hollow and in communication therewith;

e. means for adjusting said hollow stemmed plunger valve to predetermined air pressure;

f. a cap with a hole;

g. means for securing said cap to the hollow stem of the plunger valve with the said cap hole in communication with the stem hollow;

h. a radio wave transmitter separate from the hollow body housing within range for transmitting radio waves to said housing;

i. a radio wave relay mounted, to the hollow body housing, to close in response to an opening of the plunger valve said predetermined distance, so that radio waves received from the said transmitter are relayed;

j. means for signaling alarm responsive to receipt of radio waves from the said relay.

* * * * *